United States Patent
Ono

(10) Patent No.: US 9,812,690 B2
(45) Date of Patent: Nov. 7, 2017

(54) SEALED BATTERY

(71) Applicant: Tomohiro Ono, Miyoshi (JP)

(72) Inventor: Tomohiro Ono, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 671 days.

(21) Appl. No.: 14/134,186

(22) Filed: Dec. 19, 2013

(65) Prior Publication Data

US 2014/0178746 A1 Jun. 26, 2014

(30) Foreign Application Priority Data

Dec. 25, 2012 (JP) ................. 2012-281607

(51) Int. Cl.
| | |
|---|---|
| *H01M 2/08* | (2006.01) |
| *H01M 2/02* | (2006.01) |
| *H01M 2/30* | (2006.01) |
| *H01M 2/04* | (2006.01) |
| *H01M 2/06* | (2006.01) |

(52) U.S. Cl.
CPC ............ *H01M 2/30* (2013.01); *H01M 2/0217* (2013.01); *H01M 2/0404* (2013.01); *H01M 2/06* (2013.01)

(58) Field of Classification Search
CPC ........ H01M 2/06; H01M 2/0217; H01M 2/30; H01M 2/0404
See application file for complete search history.

(56) References Cited

U.S. PATENT DOCUMENTS

2010/0047686 A1 2/2010 Tsuchiya et al.

FOREIGN PATENT DOCUMENTS

| CN | 101578723 A | 11/2009 |
|---|---|---|
| JP | A-2008-251213 | 10/2008 |
| JP | A-2009-110687 | 5/2009 |
| JP | A-2011-243559 | 12/2011 |
| JP | A-2012-28246 | 2/2012 |
| JP | A-2012-155947 | 8/2012 |

OTHER PUBLICATIONS

Toyota Technical Publication (*Toyota Gijutsu Kokaishu*) TKO24606, Toyota Motor Corporation, 2011, pp. 253-254.

*Primary Examiner* — Ula C Ruddock
*Assistant Examiner* — Matthew Van Oudenaren
(74) *Attorney, Agent, or Firm* — Oliff PLC

(57) ABSTRACT

A sealed battery includes a current-collecting terminal member; a gasket that electrically insulates a lid member and the current-collecting terminal member from each other; and a connection member that connects the current-collecting terminal member and an external terminal member. The connection member and the current-collecting terminal member are connected by swaging the second end of the current-collecting terminal member to an insertion hole of the connection member. The lid member has a lid-side protruded portion that compresses the gasket. The current-collecting terminal member has a terminal-side protruded portion that compresses the gasket. A gasket-side area of the lid-side protruded portion, a gasket-side area of the terminal-side protruded portion, and an area of a surface of the current-collecting terminal member which faces and contacts the gasket, except the terminal-side protruded portion, are different in size from each other.

2 Claims, 5 Drawing Sheets

SEALED BATTERY

INCORPORATION BY REFERENCE

The disclosure of Japanese Patent Application No. 2012-281607 filed on Dec. 25, 2012 including the specification, drawings and abstract is incorporated herein by reference in its entirety.

BACKGROUND OF THE INVENTION

1. Field of the Invention

The invention relates to a sealed battery and, more particularly, to a technology of producing a terminal structure of a sealed battery.

2. Description of Related Art

In a sealed battery having a rectangular parallelepiped shape, its jacket houses an electricity generating element of the battery. Within the jacket, at each of a side of a positive electrode terminal and a side of a negative electrode terminal there is disposed a current-collecting terminal member that extends through the wall of the jacket and is protruded outward from the jacket. Inside the jacket, a first end of each current-collecting terminal member is electrically connected to the electricity generating element, and outside the jacket, a second end of each current-collecting terminal member is electrically connected to a corresponding one of external terminal members. Therefore, electric power can be given and received between the inside and outside of the battery.

In some cases, platy connection members are used to electrically connect, outside the jacket, the second ends of the current-collecting terminal members to the external terminal members as described above. It is to be noted that there is known a technology of interconnecting the second end of a current-collecting terminal member and a connection member by swaging the second end of the current-collecting terminal member to an insertion hole formed in the connection member (see, e.g., Japanese Patent Application Publication No. 2012-028246 (JP 2012-028246 A)).

As in JP 2012-028246 A, when the second end of a current-collecting terminal member is to be connected to a connection member, air-tightness of an internal space of the sealed battery is secured by compressing a gasket that insulates the current-collecting terminal member from a lid member. At this time, since the gasket compression process cannot be seen or grasped from outside, it is a normal practice to compress the gasket with a certain load. However, according to the aforementioned gasket compression with a certain load, there is a possibility of occurrence of excessive compression or insufficient compression of the gasket due to variations in the dimensions of component parts, such as the lid member, the current-collecting terminal member, the gasket, etc.

SUMMARY OF THE INVENTION

The invention provides a sealed battery capable of preventing excessive compression and insufficient compression of the gasket at the time of swaging the second end of the current-collecting terminal member to the connection member despite variations in the dimensions of component parts, such the gasket and the like.

An aspect of the invention relates to a sealed battery that includes: an electricity generating element; a container member that has a bottomed rectangular columnar shape and that houses the electricity generating element; a rectangular lid member that closes an opening of the container member and that has a through hole; an external terminal member protruded outward from the lid member; a current-collecting terminal member whose first end is connected to the electricity generating element within the container member and whose second end is tubular and is inserted through the through hole and extends outward from the lid member; a gasket that, at an inner side of the lid member, electrically insulates the lid member and the current-collecting terminal member from each other; and a platy connection member that, at an outer side of the lid member, connects the current-collecting terminal member and the external terminal member to each other. The connection member has an insertion hole through which the second end of the current-collecting terminal member is inserted. The connection member and the current-collecting terminal member are connected by swaging the second end of the current-collecting terminal member to the insertion hole. The lid member has a lid-side protruded portion that compresses the gasket, in a gasket-side surface of the lid member. The current-collecting terminal member has, at a position facing the lid-side protruded portion, a terminal-side protruded portion that compresses the gasket, in a gasket-side surface of the current-collecting terminal member. A gasket-side area of the lid-side protruded portion, a gasket-side area of the terminal-side protruded portion, and an area of a surface of the current-collecting terminal member which faces and contacts the gasket, except the terminal-side protruded portion, are different in size from each other.

The gasket-side area of the lid-side protruded portion may be exceeded in size by the gasket-side area of the terminal-side protruded portion, which in turn may be exceeded in size by the area of the surface of the current-collecting terminal member which faces and contacts the gasket, except the terminal-side protruded portion.

According to the invention, even if component parts of the sealed battery, such as the gasket and the like, have dimensional variations, it is possible to prevent excessive compression and insufficient compression of the gasket when the second end of the current-collecting terminal member is swaged to the connection member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
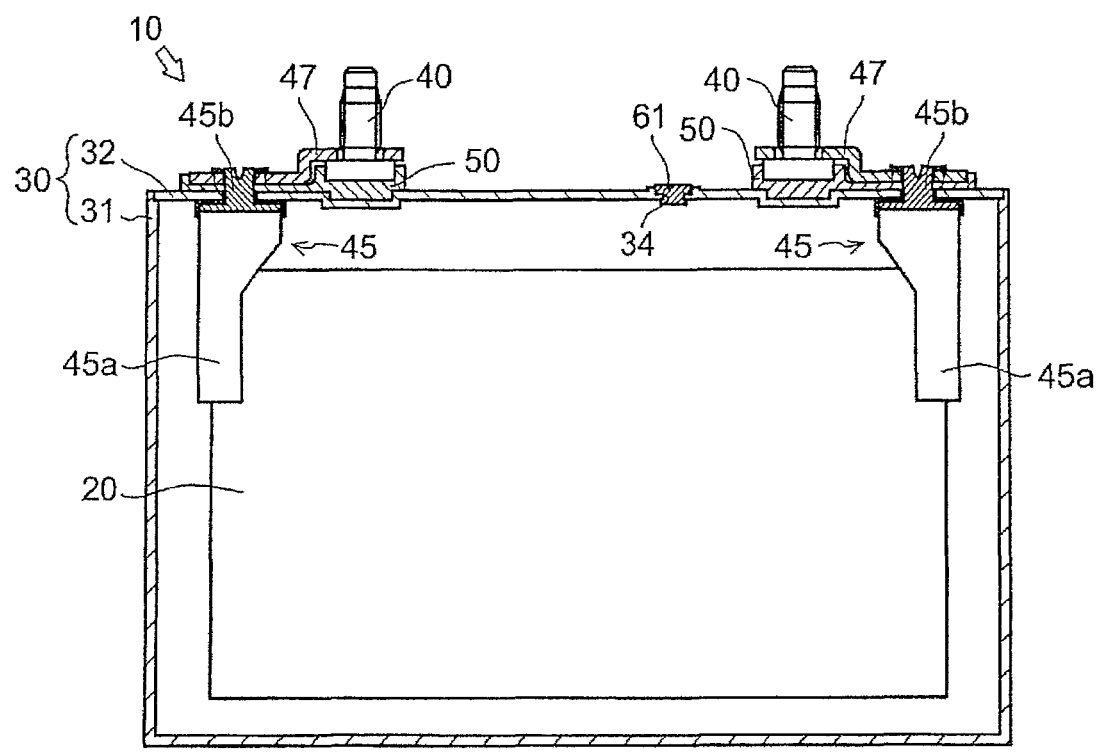
FIG. 1A is a front sectional view showing a general construction of a sealed battery.
Figure 1B:
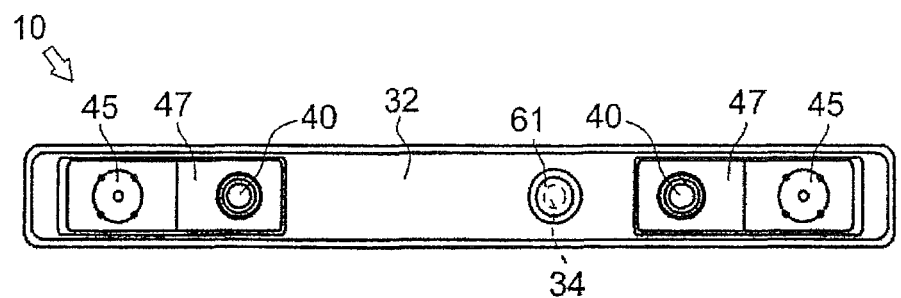
FIG. 1B is a plan view showing a general construction of the sealed battery.

The invention is not limited to the following embodiments.

With reference to FIGS. 1A and 1B and FIGS. 2A and 2B, a general construction of a battery 10 that is an embodiment of the sealed battery of the invention will be described. The battery 10 of this embodiment is a lithium-ion secondary battery. The battery 10 includes, as main component elements: an electricity-generating element 20; a jacket 30 in which the electricity-generating element 20 is housed; external terminal members 40 that are protruded outward from the jacket 30; insulation members 50 that are resinous members interposed between the external terminal members 40 and the jacket 30; current-collecting terminal members 45 a first end of each of which is connected to the electricity-generating element 20 and a second end of each of which extends out of the jacket 30; gaskets 51 that are resinous members interposed between the current-collecting terminal members 45 and the jacket 30; and platy connection members 47 that, outside the jacket 30, connect the current-collecting terminal members 45 to the external terminal members 40.

The electricity-generating element 20 is an electrode assembly formed by laminating or rolling a positive electrode, a negative electrode and separators together and impregnating them with an electrolytic solution. When the battery 10 is charged or discharged, electric current is produced by chemical reactions occurring in the electricity-generating element 20 (more specifically, migration of ions between the positive electrode and the negative electrode via the electrolytic solution).

The jacket 30 is a prismatic can that has a container member 31 and a lid member 32 that are each made of metal. The container member 31 is a member that has a bottomed rectangular columnar shape and that houses therein the electricity-generating element 20. A face of the container member 31 is open. The lid member 32 is a flat platy rectangular member having a configuration commensurate with the open face of the container member 31, and is joined to the container member 31 so as to close the opening face of the container member 31.

Figure 2A:
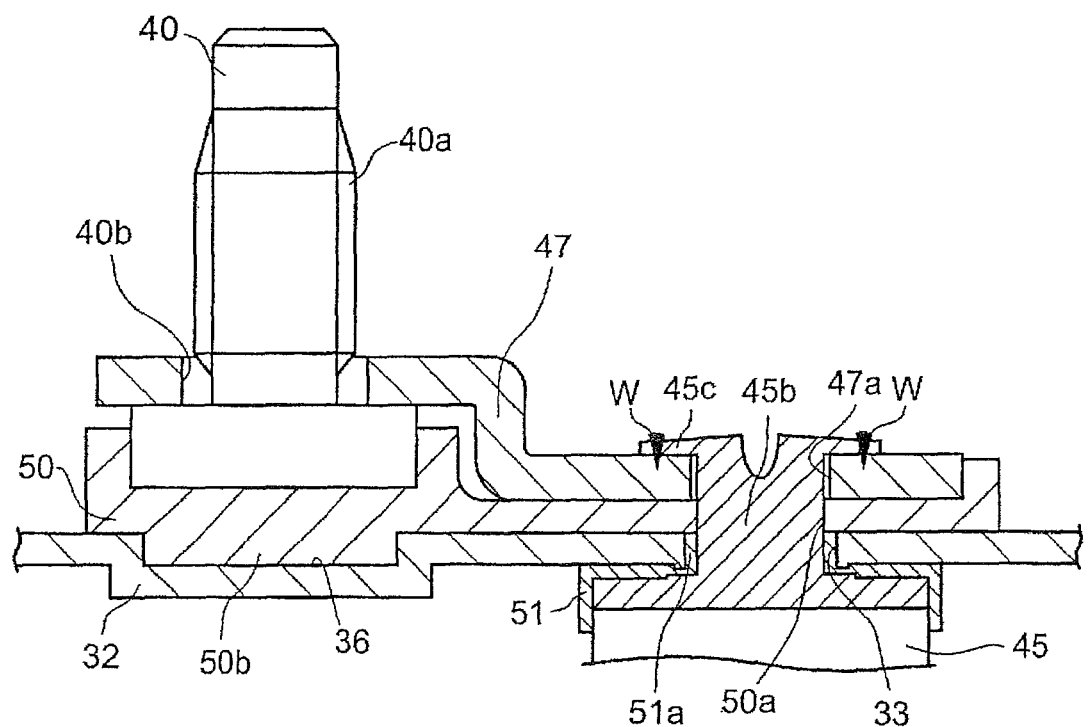
FIG. 2A is a front sectional view showing a terminal portion in the sealed battery.

As shown in FIG. 2A, the lid member 32 of the jacket 30 has through holes 33 through which the second ends of the current-collecting terminal members 45 (upper ends thereof in this embodiment) can be inserted. Each through hole 33 has a predetermined inside diameter, and extends through a wall of the jacket 30 (the lid member 32) in its thickness direction.

Furthermore, as shown in FIG. 2A, the lid member 32 has on its outside surface (an upper surface in FIG. 2A) rotation stopper groves 36 that are formed adjacent to the through holes 33. More specifically, rectangular grooves of downward depression are formed as rotation stopper grooves 36 in the lid member 32, at locations near the through holes 33.

A pour hole 34 is formed relatively near the center of the lid member 32, between the rotation stopper grooves 36. The pour hole 34 is a through hole having a predetermined inside diameter, and extends through the lid member 32 in the thickness direction of the lid member 32. The pour hole 34 is used to pour an electrolytic solution into the jacket 30 in which the electricity-generating element 20 is housed beforehand. The pour hole 34 is sealed with a seal member 61 after the electrolytic solution is poured in.

The insulation members 50 are disposed on the upper side of the lid member 32, and electrically insulate the external terminal members 40 and the connection members 47 from the lid member 32. Each insulation member 50 has an insertion hole 50a through which a second end 45b of the current-collecting terminal member 45 is inserted, and a rotation stopper portion 50b that is formed so as to have substantially the same shape as the rotation stopper groove 36 and that is fixed in the rotation stopper groove 36.

The gaskets 51 are disposed on an upper side of the current-collecting terminal member 45, at an inner side of the lid member 32 (below the lid member 32 in FIG. 2A), and electrically insulate the current-collecting terminal members 45 and the lid member 32 of the jacket 30 from each other. Each gasket 51 has a sleeve portion 51a that is inserted into a corresponding one of the through holes 33. Because the sleeve portion 51a of each gasket 51 wraps around the current-collecting terminal member 45, the current-collecting terminal member 45 is electrically insulated from the lid member 32 of the jacket 30. In other words, each current-collecting terminal member 45 is inserted into the sleeve portion 51a of a corresponding one of the gaskets 51, and extends through a corresponding one of the through holes 33.

As for materials of the insulation members 50 and the gaskets 51, a preferable material is a material excellent in high-temperature creep property, that is, a material having a long-period creep resistance to the hot-cold cycles of the battery 10. Examples of such a material include PFA (perfluoroalkoxy ethylene) and the like.

The external terminal members 40 are columnar members disposed on an upper surface of the lid member 32, via the insulation members 50, so that an end of each external terminal member 40 (an upper end thereof in this embodiment) is protruded outward. The external terminal members 40 are electrically connected to the positive electrode and the negative electrode of the electricity-generating element 20 via the current-collecting terminal members 45, respectively. The external terminal members 40 and the current-collecting terminal members 45 function as a current-carrying path for outputting electric power stored in the electricity-generating element 20 or inputting electric power from outside into the electricity-generating element 20. A portion of each of the external terminal members 40 which is protruded outward from the battery 10 is threaded by a thread-rolling process, and is thus formed as a bolt portion 40a (see FIG. 2A).

A first end 45a of each of the current-collecting terminal members 45 (a lower end thereof in this embodiment) is connected to a positive electrode plate or a negative electrode plate of the electricity-generating element 20. Furthermore, the second end 45b of each current-collecting terminal member 45 (an upper end thereof in this embodiment) is tubular, and is inserted through a corresponding one of the through holes 33 of the lid member 32 and extends out (upward) from the lid member 32. As for materials of the current-collecting terminal members 45, for example, aluminum may be used for the positive electrode-side member and copper may be used for the negative electrode-side member.

Figure 2B:
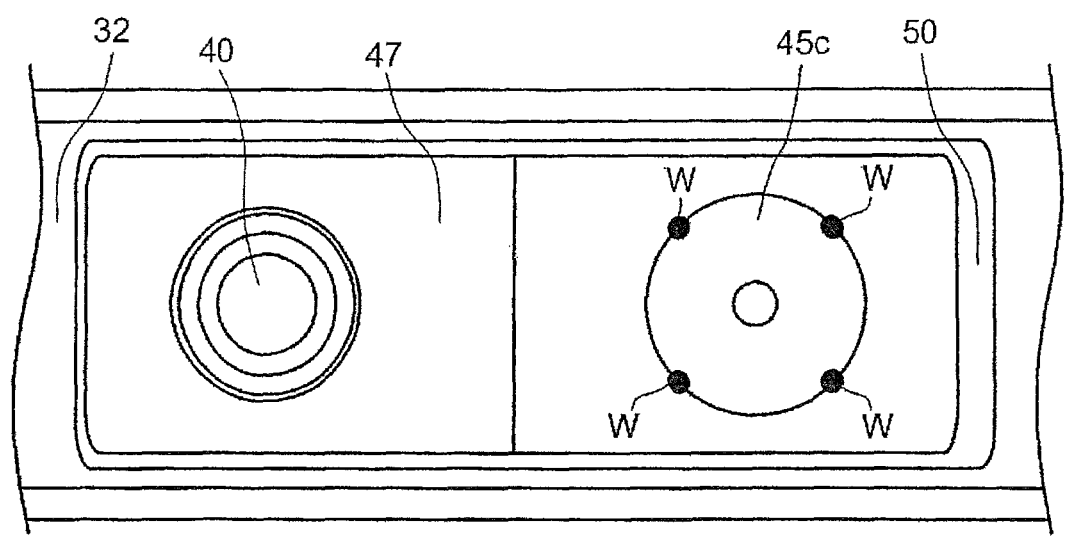
FIG. 2B is a plan view showing the terminal portion in the sealed battery.

The connection members 47 are electroconductive platy members that have a crank shape in a sectional view as shown in FIG. 2A. Each connection member 47 has an insertion hole 47a and an external terminal hole 47b both of which extend in the thickness direction of the connection member 47. Since the two connection members 47 and their adjacent structures (the two terminal portions) are substantially identical (or symmetric) to each other, description below will sometimes be made with regard to only one of the connection members 47 or only one of the two terminal portions. The second end 45b of the current-collecting terminal member 45 is inserted into the insertion hole 47a, and is swaged to the insertion hole 47a so that the connection member 47 and the current-collecting terminal member 45 are connected (see FIGS. 4A and 4B). The second end 45b of the current-collecting terminal member 45 is swaged so as to spread in a circular disc shape as shown in FIGS. 2A and 2B. Hereinafter, the circular disc-shaped portion of the second end 45b of each current-collecting terminal member 45 is termed the swage portion 45c. In order to secure electroconductivity between the current-collecting terminal member 45 and the connection member 47, an outer peripheral side end portion of the swage portion 45c of the current-collecting terminal member 45 is welded to the connection member 47 (welded portions W).

Furthermore, the external terminal member 40 is inserted through the external terminal hole 47b of the connection member 47. Then, a bus bar (not shown) through which the external terminal member 40 is inserted is placed on an upper surface of the connection member 47, and a nut is fastened to the bolt portion 40a of the external terminal member 40 from above the bus bar. In this manner, the connection member 47 and the external terminal member 40 are connected together. That is, the current-collecting terminal member 45 and the external terminal member 40 are connected by the connection member 47 at the outer side of the lid member 32.

Figure 3A:
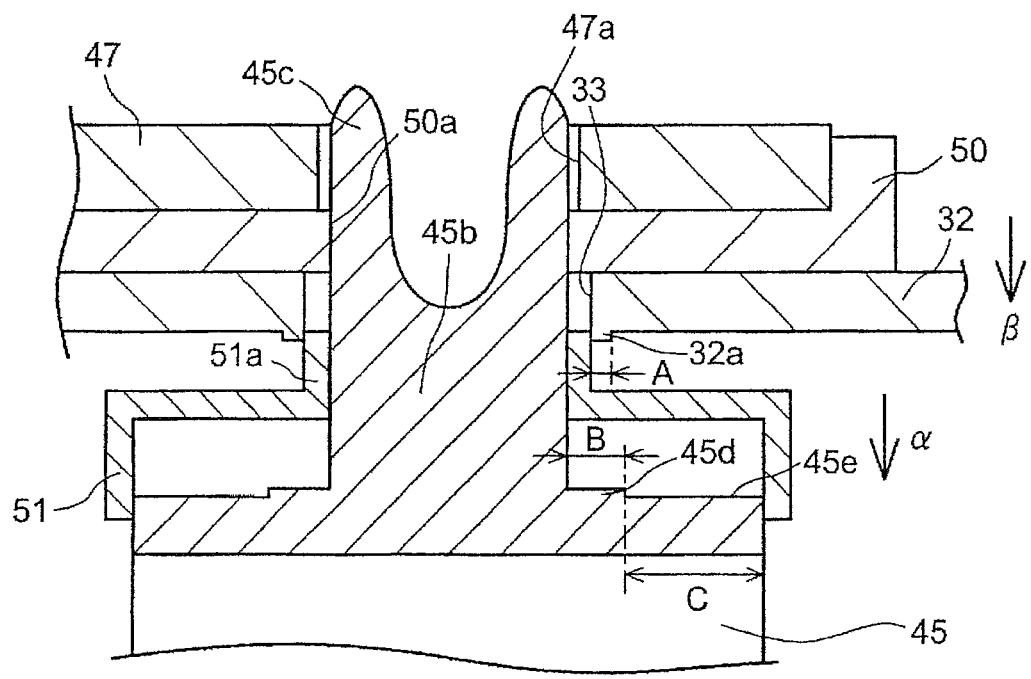
FIG. 3A is a front sectional view showing a terminal portion in the sealed battery.

Next, with reference to FIGS. 3A and 3B and FIGS. 4A and 4B, a procedure of compressing the gasket 51 when the second end 45b of the current-collecting terminal member 45 is swaged to the connection member 47 will be described. As shown in FIG. 3A, on a gasket 51-side surface of the lid member 32 (the lower surface thereof in FIG. 3A), around the through hole 33 there is formed a lid-side protruded portion 32a protruded to the gasket 51 side so as to compress the gasket 51 from above. The gasket 51-side area of the lid-side protruded portion 32a is termed the area A.

Furthermore, on a gasket 51-side surface of the current-collecting terminal member 45 (the upper surface thereof in FIG. 3A), around the second end 45b there is formed a terminal-side protruded portion 45d that is protruded to the gasket 51 side at a position that faces the lid-side protruded portion 32a so that the terminal-side protruded portion 45d compresses the gasket 51 from below. The gasket 51-side area of the terminal-side protruded portion 45d is termed the area B. The area of an upper surface of the current-collecting terminal member 45 that faces the gasket 51, except the terminal-side protruded portion 45d (hereinafter, referred to as "general portion 45e"), is termed the area C. As shown in FIG. 3A, the areas A, B and C are different in size from each other.

When the second end 45b of the current-collecting terminal member 45 is to be swaged to the connection member 47, an operation is performed as follows. Firstly, as shown in FIG. 3A, the second end 45b of the current-collecting terminal member 45 is inserted from the inside to the outside of the jacket 30 through the sleeve portion 51a of the gasket 51, the through hole 33 of the lid member 32, the insertion hole 50a of the insulation member 50 and the insertion hole 47a of the connection member 47 in this order (at this stage, the swage portion 45c is not formed into a circular disc shape yet, but extends upward in a generally tubular shape).

Figure 3B:
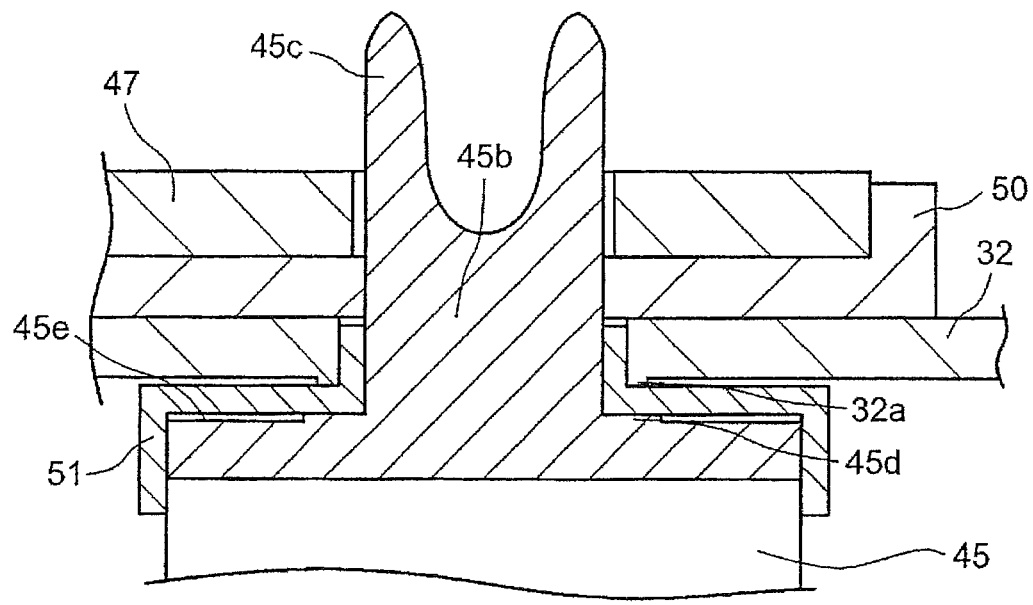
FIG. 3B is a front sectional view showing a current-collecting terminal member in the sealed battery immediately before the terminal portion is swaged.

Then, the gasket 51 is lowered as shown by an arrow α in FIG. 3A so that the lower surface of the gasket 51 contacts the terminal-side protruded portion 45d of the current-collecting terminal member 45 as shown in FIG. 3B. Furthermore, the lid member 32, the insulation member 50 and the connection member 47 are similarly lowered as shown by an arrow β in FIG. 3A so that the lid-side protruded portion 32a of the lid member 32 contacts the upper surface of the gasket 51 as shown in FIG. 3B. At this time, the sleeve portion 51a of the gasket 51 is inserted into the through hole 33.

Figure 4A:
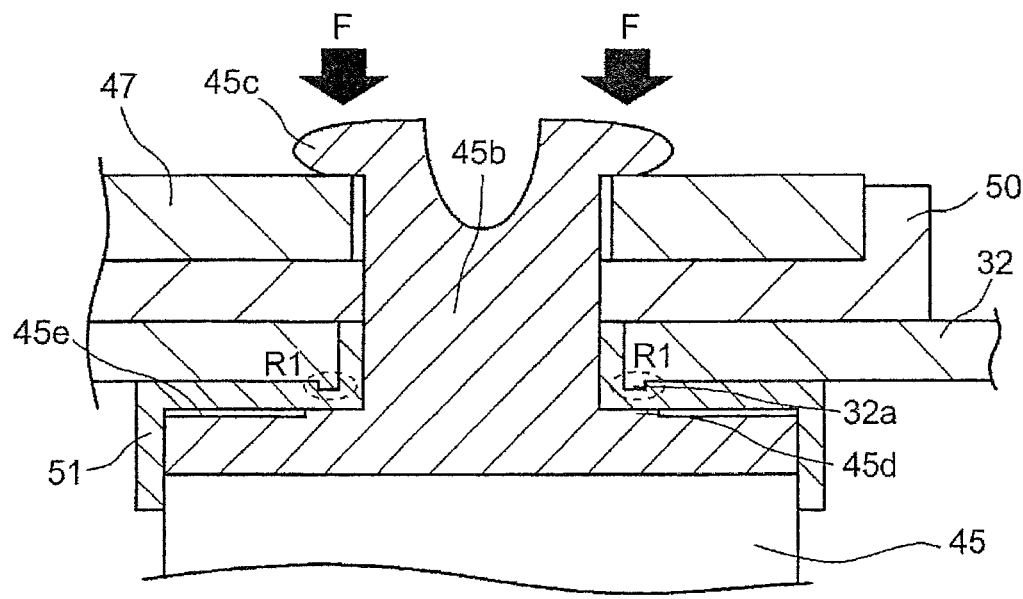
FIG. 4A is front sectional view showing the current-collecting terminal member in the sealed battery during the swaging process.

Then, as shown by arrows F in FIG. 4A, the swage portion 45c is pressurized and spread into a circular disc shape via a swage jig (not shown). At this time, the gasket 51 receives compression forces from both above and below. However, the compression of the gasket 51 starts first in a portion that contacts the lid-side protruded portion 32a (a range R1 shown in FIG. 4A) because the contact area of the gasket 51 with the lid-side protruded portion 32a (the area A) is smaller than the contact area with terminal-side protruded portion 45d (the area B) and therefore the pressure form the lid-side protruded portion 32a on the gasket 51 is greater. The process in which the gasket 51 is compressed substantially exclusively by the lid-side protruded portion 32a is termed the first step. Then, as shown in FIG. 4A, the lid-side protruded portion 32a becomes embedded in the upper surface of the gasket 51 so that the entire upper surface of the gasket 51 contacts the lower surface of the lid member 32.

Figure 4B:
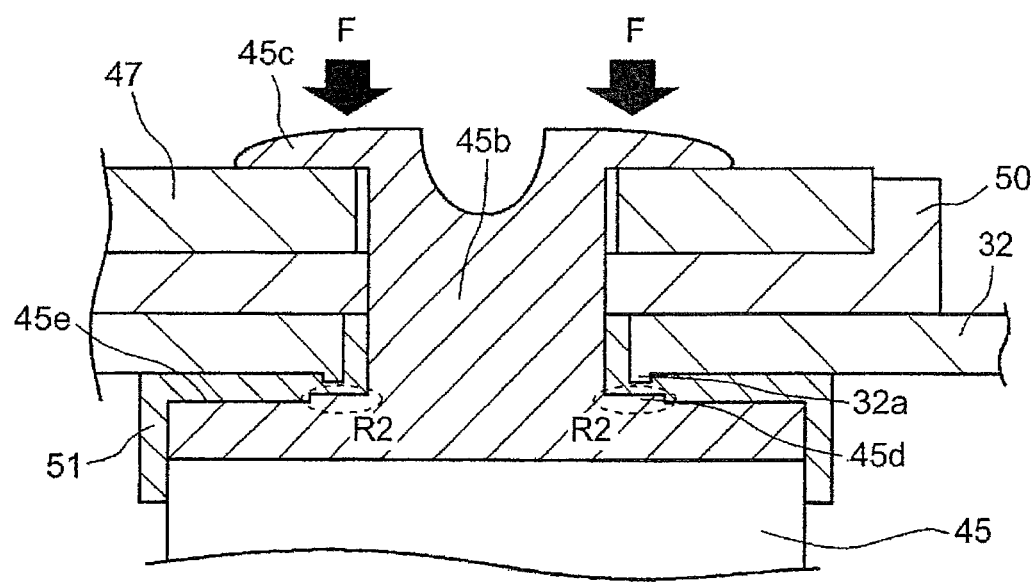
FIG. 4B is a front sectional view showing the current-collecting terminal member in the sealed battery after the swaging process.

After that, the compression is further conducted via the swage jig (not shown) as shown by arrows F in FIG. 4B. At this time, since the lid-side protruded portion 32a has already been embedded in the upper surface of the gasket 51, the lid member 32 contacts the whole upper surface of the gasket 51, so that the contact area of the gasket 51 with the terminal-side protruded portion 45d (area B), which is provided below, is smaller than the contact area with the lid member 32, which is provided above. Therefore, the compression of a portion of the gasket 51 that contacts the terminal-side protruded portion 45d (a range R2 shown in FIG. 4B) starts since the pressure from the terminal-side protruded portion 45d on the gasket 51 is now greater. The process in which the gasket 51 is compressed substantially exclusively by the terminal-side protruded portion 45d is termed the second step.

Then, as shown in FIG. 4B, the terminal-side protruded portion 45d is embedded in the lower surface of the gasket 51, and the entire lower surface of the gasket 51 contacts the upper surface of the current-collecting terminal member 45. That is, the lower surface of the gasket 51 contacts not only the terminal-side protruded portion 45d but also the general portion 45e (area C) of the upper surface of the current-collecting terminal member 45. Then, the gasket 51 is compressed substantially exclusively by the general portion 45e, and the compression of the gasket 51 ends when a predetermined stroke is completed. The process in which the gasket 51 is compressed by the general portion 45e is termed the third step.

Figure 5A:
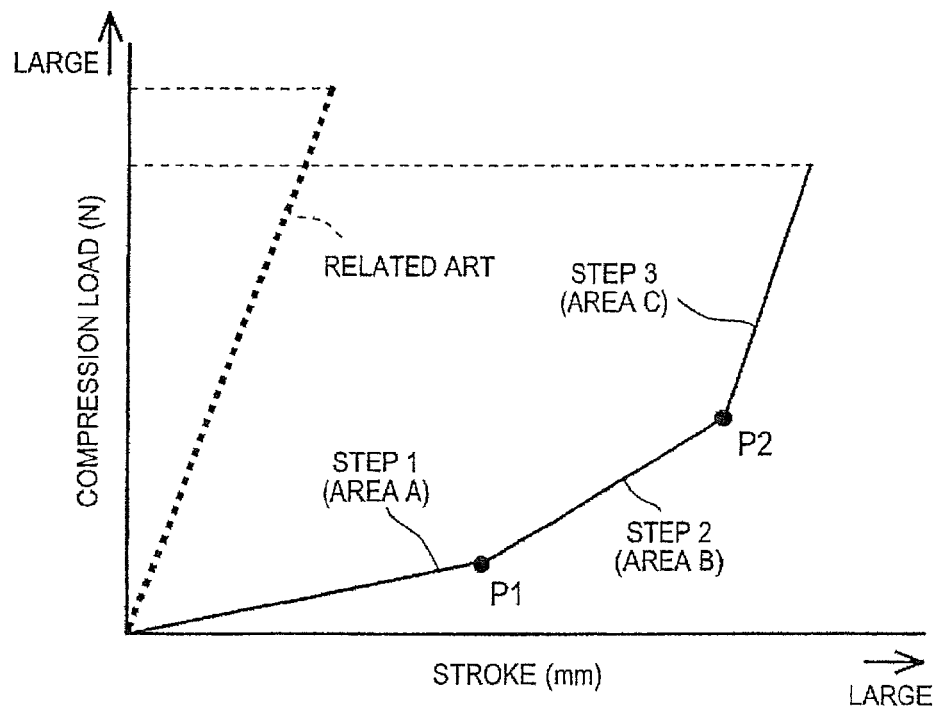
FIG. 5A is a diagram showing changes in the gasket compression load.

With regard to the battery 10 in accordance with the embodiment, changes in the stroke and the compression load when the gasket 51 is compressed will be described with reference to FIG. 5A. As shown in FIG. 5A, in the first step, the gasket 51 is compressed by the area A of the lid-side protruded portion 32a, which is relatively small, so that the amount of increase in the compression load relative to the amount of increase in the stroke (the gradient of the compression load) is small. Subsequently, in the second step, the gasket 51 is compressed by the area B, which is larger than the area A, so that the amount of increase in the compression load to the amount of increase in the stroke (the gradient of the compression load) is larger than in the first step. Furthermore, in the third step, the gasket 51 is compressed by the area C, which is larger than the area B, so that the amount of increase in the compression load to the amount of increase in the stroke (the gradient of the compression load) is larger than in the second step.

That is, according to the embodiment, the transition of the compressed state of the gasket 51 from the first step to the second step (which corresponds to a point P1 in FIG. 5A) and the transition of the compressed state of the gasket 51 from the second step to the third step (which corresponds to a point P2 in FIG. 5A) can be detected by estimation from a change in the gradient of the compression load. In other words, the end of the compression of the gasket 51 by the lid-side protruded portion 32a can be detected on the basis of the point P1, which indicates the transition from the first step to the second step. Likewise, the end of the compression of the gasket 51 by the terminal-side protruded portion 45d can be detected on the basis of the point P2, which indicates the transition from the second step to the third step. That is, the passage through the point P1 and the point P2 makes it possible to determine from outside that the gasket 51 has been sufficiently compressed by the lid-side protruded portion 32a and the terminal-side protruded portion 45d.

On the other hand, according to the related art, since the compression process of a gasket cannot be detected or grasped from outside, it is a normal practice to compress the gasket until a predetermined stroke has occurred (or a predetermined time has passed), as shown by an interrupted line in FIG. 5A. Therefore, there is a possibility of occurrence of excessive compression or insufficient compression of the gaskets due to variations in the dimensions of component parts, such as the gaskets and the like. According to the embodiment, however, the passage through the point P1 and the point P2 allows recognition that the gasket 51 has been sufficiently compressed by the lid-side protruded portion 32a and the terminal-side protruded portion 45d, so that occurrence of insufficient compression of the gasket 51 can be prevented. Furthermore, by stopping the compression after an appropriate stroke occurs following the passage through the point P2, excessive compression of the gasket 51 can also be prevented. That is, the battery 10 in the embodiment is capable of preventing excessive compression and insufficient compression of the gasket 51 at the time of swaging the second end 45b of the current-collecting terminal member 45 to the connection member 47, despite variations in the dimensions of component parts, such as the gaskets 51 and the like.

Furthermore, according to this embodiment, the areas A, B and C increase in size in this order. Therefore, the gradient of the compression load increases in the order of the first, second and third steps, so that it is easy to recognize that the compressed state of the gasket 51 changes from the first step to the second step and from the second step to the third step.

Figure 5B:
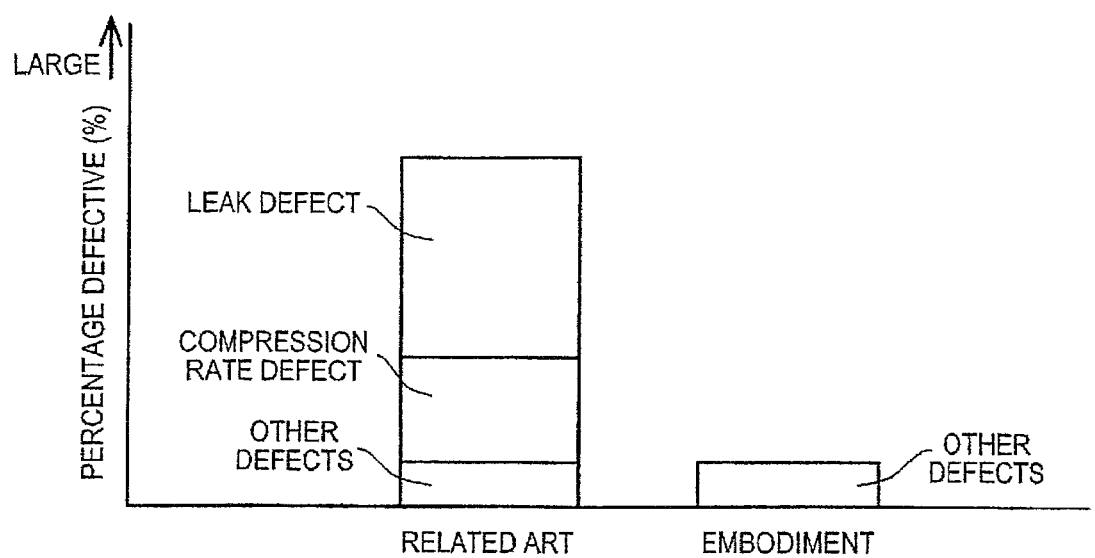
FIG. 5B is a diagram showing percent defectives of sealed batteries.

FIG. 5B shows comparison between the related art and the embodiment in percent defective. As shown in FIG. 5B, leak defect (air-tightness defect due to insufficient compression or excessive compression of a gasket), compression rate defect (gasket compression rate abnormality) and other defects were observed in the related art. On the other hand, according to the embodiment, although the other defects occurred, the leak defect and the compression rate defect were prevented. Therefore, while in the related art it is necessary to perform a leak test on all the processed articles after a process in which the gasket is compressed by swaging the second end of the current-collecting terminal member to the connection member, the embodiment allows omission of this leak test. That is, according to the embodiment, the production process of the battery 10 can be shortened.

What is claimed is:
1. A sealed battery comprising:
an electricity generating element;
a container member that has a bottomed rectangular columnar shape, the container member houses the electricity generating element;
a rectangular lid member that closes an opening of the container member, the lid member has a through hole;
an external terminal member that protrudes outward from the lid member;
a current-collecting terminal member that has: (i) a first end connected to the electricity generating element within the container member, and (ii) a second end that is tubular, the second end is inserted through the through hole and extends outward from the lid member;
a gasket that electrically insulates the lid member and the current-collecting terminal member from each other at an inner side of the lid member; and
a platy connection member that connects the current-collecting terminal member and the external terminal member to each other at an outer side of the lid member, the platy connection member has an insertion hole through which the second end of the current-collecting terminal member is inserted, and the platy connection member and the current-collecting terminal member are connected by swaging the second end of the current-collecting terminal member to the insertion hole, wherein:
the lid member has a lid-side protruded portion that compresses the gasket in a gasket-side surface of the lid member, the lid-side protruded portion protruding in a downward direction from the lid member towards the gasket;
the current-collecting terminal member has, at a position facing the lid-side protruded portion, a terminal-side protruded portion that compresses the gasket in a gasket-side surface of the current-collecting terminal member, the terminal-side protruded portion protruding in an upward direction from a surface of the current-collecting terminal member, which faces and contacts the gasket, towards the gasket; and
a gasket-side area of the lid-side protruded portion, a gasket-side area of the terminal-side protruded portion, and an area of the surface of the current-collecting terminal member that faces and contacts the gasket, which is different than the terminal-side protruded portion of the current-collecting terminal member, are each different sizes.
2. The sealed battery according to claim 1, wherein the gasket-side area of the lid-side protruded portion is smaller than the gasket-side area of the terminal-side protruded portion, the gasket-side area of the terminal-side protruded portion is smaller than the area of the surface of the current-collecting terminal member which faces and contacts the gasket, which is different than the terminal-side protruded portion of the current-collecting terminal member.

* * * * *